US010635487B2

(12) United States Patent
Giampetro et al.

(10) Patent No.: US 10,635,487 B2
(45) Date of Patent: Apr. 28, 2020

(54) SYSTEMS AND METHODS DEFINING THREAD SPECIFICATIONS

(71) Applicant: Oracle International Corporation, Redwood Shores, CA (US)

(72) Inventors: Andrew J. Giampetro, Southampton, NJ (US); Russell Ashley Broom, Atlanta, GA (US); Ricarda Heuss, Berlin (DE)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 16/105,842

(22) Filed: Aug. 20, 2018

(65) Prior Publication Data
US 2019/0102222 A1    Apr. 4, 2019

Related U.S. Application Data

(60) Provisional application No. 62/565,996, filed on Sep. 29, 2017.

(51) Int. Cl.
*G06F 9/48* (2006.01)
(52) U.S. Cl.
CPC .................. *G06F 9/4881* (2013.01)
(58) Field of Classification Search
CPC ...... G06F 8/4452; G06F 8/452; G06F 9/3842; G06F 9/4881
See application file for complete search history.

(56) References Cited

U.S. PATENT DOCUMENTS

| 6,470,375 | B1 | 10/2002 | Whitner et al. |
| 7,496,735 | B2* | 2/2009 | Yourst .................. G06F 9/3808 712/216 |
| 7,631,291 | B2 | 12/2009 | Shukla et al. |

(Continued)

FOREIGN PATENT DOCUMENTS

CN            101706714            5/2010

OTHER PUBLICATIONS

International Application No. PCT/US2018/050601, International Search Report and Written Opinion dated Dec. 31, 2018, 8 pages.
(Continued)

*Primary Examiner* — Dong U Kim
(74) *Attorney, Agent, or Firm* — Kilpatrick Townsend & Stockton LLP

(57) ABSTRACT

Methods and systems are disclosed for executing tasks in a partially out-of-order execution environment. Input is received indicating a task and task type for execution within an environment. Functions associated with the task and type of task may be selected. An instruction may be generated for each function indicating that the function is configured for static scheduling or dynamic scheduling. A schedule for instantiating each function may be generated, where functions configured for static scheduling are scheduled for instantiation according to a position of the function within the list and functions configured for dynamic scheduling are scheduled for instantiation at runtime based on an environment in which the function is instantiated and a position of the function of the subset of the set of functions within the list. A thread specification may then be generated using the functions and list. The thread specification may transmitted to remote devices.

20 Claims, 10 Drawing Sheets

(56) References Cited

U.S. PATENT DOCUMENTS

| | | | |
|---|---|---|---|
| 7,711,694 | B2 | 5/2010 | Moore |
| 7,747,958 | B2 | 6/2010 | Luo et al. |
| 8,255,813 | B2 | 8/2012 | Yaseen et al. |
| 8,589,939 | B2 * | 11/2013 | Craik ............... G06F 9/4881 718/104 |
| 8,893,149 | B2 | 11/2014 | Yu et al. |
| 9,298,334 | B1 | 3/2016 | Zimmerman et al. |
| 2002/0099756 | A1 * | 7/2002 | Catthoor ............ G06F 17/5045 718/102 |
| 2005/0254436 | A1 * | 11/2005 | Hoe ................... G06F 17/5045 370/252 |
| 2006/0200795 | A1 * | 9/2006 | MacLay ................ G06F 9/455 717/106 |
| 2013/0254751 | A1 * | 9/2013 | Howard ................... G06F 8/30 717/136 |
| 2015/0317190 | A1 * | 11/2015 | Ebcioglu ............ G06F 17/5045 718/106 |

OTHER PUBLICATIONS

"CAF Guided Procedures at Runtime", SAP Library, available online at https://help.sap.com/saphelp_NW70EHP1/ helpdata/en/b6/c07b42c9366255e10000000a155106/frameset.htm, accessed from the internet on Dec. 13, 2017, 5 pages.

"Guided Procedure, Usability Enhancement for SAP PPM", available online at https://websmp201.sap-ag.de/~sapidp/012002523100010454692015E/Guided_Procedure_EN.pdf, accessed from the internet on Dec. 13, 2017, 8 pages.

"Managing Permissions", available online at https://help.sap.com/doc/ff4d26466c5510148de3f3952be66f82/7.02.19/ en-US/433880690ed5181ae10000000a1553f6.html, accessed from the internet on Dec. 13, 2017, 3 pages.

"SAP Guided Procedures", available online at: https://archive.sap.com/documents/docs/DOC-8785, accessed from the internet on Dec. 13, 2017, 3 pages.

"Security Guide for Guided Procedures", SAP Library, available online at https://help.sap.com/saphelp_nw73EhP1 /helpdata/en/ff/1b3a4209a6ae04e10000000a1550b0/frameset.htm, accessed from the internet on Dec. 13, 2017, 7 pages.

Hennig, "Guided Procedures Authoring Tool, SAP IT Service Management on SAP Solution Manager", available online at https://wiki.scn.sap.com/wiki/display/SAPITSM/Guided+Procedures+Authoring+Tool, Jan. 28, 2016, 11 pages.

Richarts, "How to Create or Edit Guided Procedures, Technical Operations—SCN Wiki", available online at https://wiki.scn.sap.com/wiki/display/TechOps/How+to+create+or+edit+guided+procedures, Oct. 27, 2014, 9 pages.

Rickayzen, "Task-Oriented Support for Your Department's Informal Processes—Without Calling on IT", available online at https://archive.sap.com/kmuuid2/b866ae10-0b01-0010-cc85-e6c886cbfa84/Task-Oriented%20Support%20for%20Your%20Department's%20Informal%20Processes%20-%20Without%20Calling%20on%20IT.pdf, Apr.-May-Jun. 2006, 5 pages.

SAP Navigator, "Guided Procedures", https://help.sap.com/saphelp_nw74/helpdata/en/global/misc/treectrt.htm, accessed from the internet on Dec. 13, 2017, 4 pages.

SAP Netweaver, "Composite Application Framework—Guided Procedures, Guided Procedures Functions and Features", available online at https://archive.sap.com/kmuuid2/d261b611-0b01-0010-7781-acb929f30163/Guided%20Procedures%20Functions%20and%20Features.pdf, accessed from the internet on Dec. 13, 2017, 1 page.

* cited by examiner

SYSTEMS AND METHODS DEFINING THREAD SPECIFICATIONS

CROSS-REFERENCE TO RELATED APPLICATIONS

The application claims the benefit of and priority to U.S. Provisional Application No. 62/565,996, filed on Sep. 29, 2017 which is hereby incorporated by reference in its entirety for all purposes.

This application expressly incorporates by reference U.S. application Ser. No. 15/399,565, filed on Jan. 5, 2017, entitled "SYSTEMS AND METHODS FOR BUILDING APPLICATIONS USING BUILDING BLOCKS LINKABLE WITH METADATA"; and U.S. application Ser. No. 15/399,560, filed on Jan. 5, 2017, entitled "SYSTEMS AND METHODS FOR BUILDING APPLICATIONS USING BUILDING BLOCKS LINKABLE WITH METADATA", in their entirety for all purposes. In addition, this application expressly incorporates by reference U.S. application Ser. No. 14/934,061, filed on Nov. 5, 2015, entitled "SINGLE UNIT OF WORK"; and U.S. application Ser. No. 11/851,456, filed on Sep. 7, 2007, entitled "USER INTERFACE FOR HUMAN INVOLVED BUSINESS PROCESSES", in their entirety for all purposes.

FIELD

The present invention relates generally to defining and scheduling threads for execution, and more particularly to generating and scheduling threads for execution by one or more processors in a partially out-of-order execution environment.

BACKGROUND

Threads are usually constrained to execute according to a strict schedule. When a processing systems experiences a stall (or bubble) in which there is a delay and/or fault in executing a particular thread, subsequent threads may be delayed as well. For example, a thread requiring data in a register that is currently being written to may force the processing system to stall the thread until the register is available to be loaded. Thus, even a small delay in a thread may cause a ripple effect that delays every subsequent thread regardless of whether subsequent threads are dependent on the delayed thread. This can be problematic in a variety of environments, especially in time sensitive environments in which a strict amount of processing time may be allotted to particular threads.

In certain execution environments stalls may prevent entire tasks from executing. For example, in time sensitive environments, failure to execute within an allotted stages may force an interrupt that prevents remaining threads from executing. A set of threads may fail due to a stalled thread. A stall or fault in a thread may have a cascading effect reducing the number of threads the environment is able to execute within a processing window if not causing the system to crash. For example, resource exhaustion (i.e., thrashing), infinite looping subtasks, memory faults, or prefetching faults may prevent a thread from instantiating or terminating appropriately. As a result, the thread may not terminate and a subsequent threads may be prevented from instantiating causing the system to crash.

There is a need in the art for improved methods and systems related to defining and scheduling threads for execution.

SUMMARY

In embodiments, the present disclosure provides for scheduling threads in a partially out-of-order execution environment that provides fault tolerant execution of tasks. For a given thread, one or more functions may be defined to execute a portion of a thread. The one or more functions may be dynamically scheduled for execution in a partially out-of-order execution environment that enforces strict scheduling for functions with particular dependencies while enabling permissive out-of-order execution for functions with few or no dependencies. If a stall occurs in a function, available functions with a permissive out-of-order designation may execute in place of the stalled function while the stalled function is forced to wait. Functions may then continue to execute according to the loose scheduling thereby preventing the stalled function to crash the thread.

Some embodiments of the present disclosure provides a method of scheduling functions for execution of a task in a partially out-of-order execution environment. The method comprising receiving input indicating a task for execution within one or more environments; receiving input indicating a type for the task, the type being associated with a set of functions; receiving input identifying a subset of the set of functions, the subset of the set of functions being configured to execute the task; generating an instruction for each function of the subset of the set of functions, the instruction indicating that the function is configured for static scheduling or dynamic scheduling; generating a list indicating a schedule for instantiating each function of the subset of the set of functions, wherein functions are scheduled for instantiation based on the instruction corresponding to each function of the subset of the set of functions such that: functions of the subset of the set of functions configured for static scheduling are scheduled for instantiated according to a position of the function of the subset of the set of functions within the list; functions of the subset of the set of functions including dynamic scheduling are scheduled for instantiation at runtime based on an environment in which the function is instantiated and a position of the function of the subset of the set of functions within the list; packaging, based on the list, the subset of the set of functions into a specification for the task; transmitting the specification, wherein the specification is configured to instantiate each function, based on the schedule of the list, to execute the task.

Some embodiments of the present disclosure provides a system of scheduling functions for execution of a task in a partially out-of-order execution environment. The system comprises one or more processors; and a non-transitory machine-readable storage medium containing instructions, which when executed by the one or more processors, cause the one or more processors to perform operations including: receiving input indicating a task for execution within one or more environments; receiving input indicating a type for the task, the type being associated with a set of functions; receiving input identifying a subset of the set of functions, the subset of the set of functions being configured to execute the task; generating an instruction for each function of the subset of the set of functions, the instruction indicating that the function is configured for static scheduling or dynamic scheduling; generating a list indicating a schedule for instantiating each function of the subset of the set of functions, wherein functions are scheduled for instantiation based on the instruction corresponding to each function of the subset of the set of functions such that: functions of the subset of the set of functions configured for static scheduling are scheduled for instantiated according to a position of the function of the subset of the set of functions within the list; functions of the subset of the set of functions including dynamic scheduling are scheduled for instantiation at runtime based on an environment in which the function is instantiated and a position of the function of the subset of the set of functions within the list; packaging, based on the list, the subset of the set of functions into a specification for the task; transmitting the specification, wherein the specification is configured to instantiate each function, based on the schedule of the list, to execute the task.

Some embodiments of the present disclosure provides a non-transitory machine-readable storage medium containing instructions, which when executed by one or more processors, cause the one or more processors to perform operations including: receiving input indicating a task for execution within one or more environments; receiving input indicating a type for the task, the type being associated with a set of functions; receiving input identifying a subset of the set of functions, the subset of the set of functions being configured to execute the task; generating an instruction for each function of the subset of the set of functions, the instruction indicating that the function is configured for static scheduling or dynamic scheduling; generating a list indicating a schedule for instantiating each function of the subset of the set of functions, wherein functions are scheduled for instantiation based on the instruction corresponding to each function of the subset of the set of functions such that: functions of the subset of the set of functions configured for static scheduling are scheduled for instantiated according to a position of the function of the subset of the set of functions within the list; functions of the subset of the set of functions including dynamic scheduling are scheduled for instantiation at runtime based on an environment in which the function is instantiated and a position of the function of the subset of the set of functions within the list; packaging, based on the list, the subset of the set of functions into a specification for the task; transmitting the specification, wherein the specification is configured to instantiate each function, based on the schedule of the list, to execute the task.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
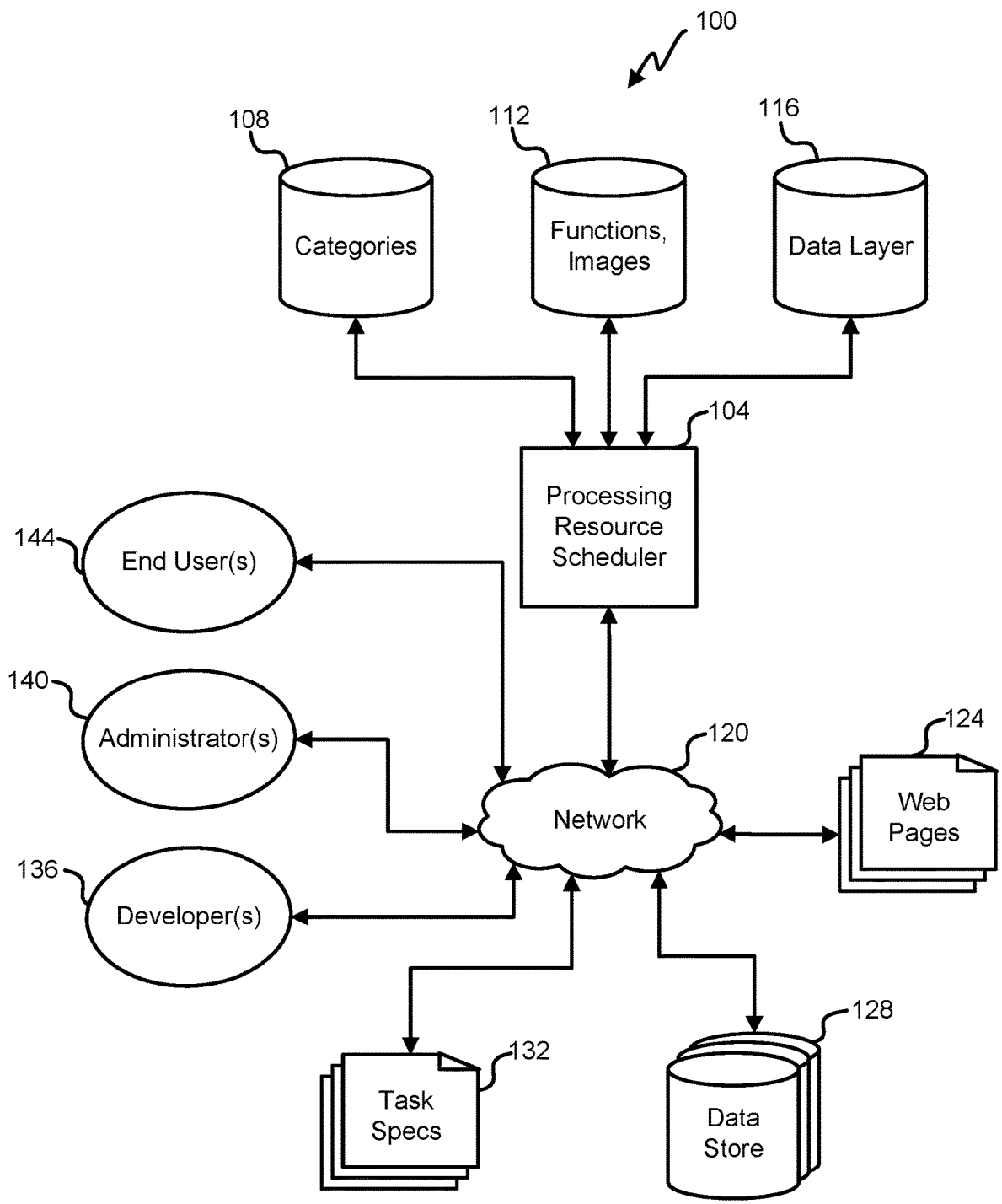
FIG. 1 illustrates an exemplary distributed environment for defining and scheduling threads.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. It is understood that the embodiments may be practiced without the specific details used to provide a thorough understanding of the embodiments described herein. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Methods and systems are disclosed that define and schedule threads for execution by one or more processors. A thread may include one or more instructions that when executed complete a task. Threads may be discrete execution units (e.g., that include the instructions, inputs, functions, and/or the needed to execute the thread). In some examples, thread templates may enable users without technical abilities to define threads. Once defined, the threads may be accessed for execution within one or more processing environments.

In some examples, threads may be defined by selecting a thread template associated with a task. For example, a thread template may be selected by an administrator to configure a particular task for execution. Particular functions associated with the thread template may be selected to implement the task. In some examples, functions may be assigned a scheduling instruction designating a function as dynamic (e.g., the function is not dependent on other functions) or static (e.g., the function depends other functions and other functions depend on the function). The scheduling instruction may be used in generated an execution schedule that indicates an order in which the functions may be executed to implement the task.

Functions associated with a thread may be scheduled at runtime to improve processing resource utilization, fault tolerance, and/or fault recovery. In some examples, detecting a particular event (e.g., fault, unexpected input, interrupt, exception, etc.) during execution of a function may trigger one or more functions to be rescheduled based on scheduling instructions associated with the thread. For example, a particular function may hang waiting to load data from a locked memory register. A function assigned a dynamic scheduling instruction may be executed while the particular function waits for the locked register. After the functions terminates, control may return to the particular function.

A thread specification may be generated using the functions selected to implement the thread and the corresponding scheduling instructions. A thread specification may include the functions, execution schedule, metadata, and/or other instructions to enable the thread specification to execute in any of one or more environments. For example, thread specifications may be accessed (e.g., from local or remote memories) and executed on any of a plurality of disparate processing environments to provide the task of the thread. In some examples, thread specifications may be combined with other thread specifications to provide complex.

FIG. 1 depicts a block diagram of an exemplary distributed execution environment 100 enabling the defining and scheduling of threads. Processing resource scheduler 104 may provide the instructions (and/or guides) for defining threads and functions that execute to provide an output or result. Processing resource scheduler 104 may provide instructions that enable static scheduling (e.g., threads/functions may be executed in a predetermined order), partially-dynamic scheduling (e.g., some threads/functions may be executed in a predetermined order and other threads/functions may be scheduled at runtime), or dynamic scheduling (e.g., threads/functions may be executed in an order determined at runtime). Processing resource scheduler 104 may take input from a plurality of databases and networks including categories 108, functions and images 112, and data layer 116 to provide some or all of the data to instantiate threads and/or functions.

Categories 108 may include templates associated with tasks. In some examples, categories 108 may include data to enable processing resource scheduler 104 to decompose threads into discrete functions. For example, processing resource scheduler 104 may obtain a particular thread template from categories 108 to execute a handshaking protocol between two network devices. Processing resource scheduler 104 may use functions and images 112 to define functions to implement a particular handshaking protocol (e.g., transport layer security (TLS)). Data layer 116 may provide particular code, data, and/or other input to complete provisioning the TLS handshaking thread(s).

In other examples, categories 108 may enable selection of a thread template associated with a task. Categories 108 may be used to identify a set of predefined functions applicable to the selected thread template that may be selected to provide the operations of the thread. One, some, or all of the predefined functions of the set of predefined functions may be selected. For example, the set of functions may include optional, redundant, and/or alternative versions of functions. The processing resource scheduler 104 may select the particular function(s) that may be applicable to the task. Functions may be modified to provide particular functionality as directed by processing resource scheduler 104 and using data from functions and images 112 and data layer 116.

Processing resource scheduler 104 may be accessed via network 120 (e.g., local area network, wide area network, Internet, etc.) by one or more devices. Processing resource scheduler 104 may obtain resources/data from webpages (e.g., user input, crawlers, etc.) and remote data store 128. Thread specifications 132 may include packaged threads that have been generated using environment 100. Thread specification 132 may be provide processing resource scheduler 104 with data to generate new threads and/or thread templates (e.g., analyzing previously generated threads and their principle components). For example, processing resource scheduler 104 may connect to another device that operates under a particular cryptographic protocol unknown to processing resource scheduler 104. Scheduler may define a new thread using the previously defined functions and threads of thread specification 132 to enable decoding data encrypted using the particular cryptographic protocol.

End users 144, administrators 140, and developers 136 may each include one or more computing devices that connect to the network and provide input to processing resource scheduler 104 and/or receive output from scheduler 104. In some examples, end users 144, administrators 140, and/or developers 136 may connect to processing resource scheduler 104 through a webpage 124, virtual private network, or through a direct connection (e.g., peer-to-peer, or the like).

Developers 136 may generate new thread specifications 132; thread templates, functions, and the like to enable administrators and/or end users to generate new thread specifications. For example, administrators 140 may provide instructions to processing resource scheduler 104 to assemble new thread specifications using the thread templates, functions, and the like generated by developers 136 without providing additional programming code. Administrators may additionally modify a thread template or functions (e.g., using a graphical user interface) to design a thread specification for a particular end-user or execution environment.

End users 144 may include one or more computing devices that provide the environment that executes each function/thread. For example, one or more end users 144 may obtain a completed thread specification to execute the thread. In some examples, a thread specification may be split across multiple end users such that some functions may be executed by one end-user and other functions may be executed by other end users. In those examples, thread-level parallelization may be further exploited by distributed processes to increase the speed in which a thread may be executed. In some examples, end users may be directed by a function to provide input and/or processing details as part of executing a thread. In other examples, the thread specification may be a workflow executed by an end-user. For example, an administrator may define functions (which in this example may include graphical user interfaces, instructions, etc.) that may be presented to an end-user in a particular schedule enabling the end-user to execute a series of steps each being defined by a function. Once each function is executed and the task completed, the output (if applicable) may be transmitted to processing resource scheduler 104, stored in data store 128, and/or to administrators 140.

Figure 2:
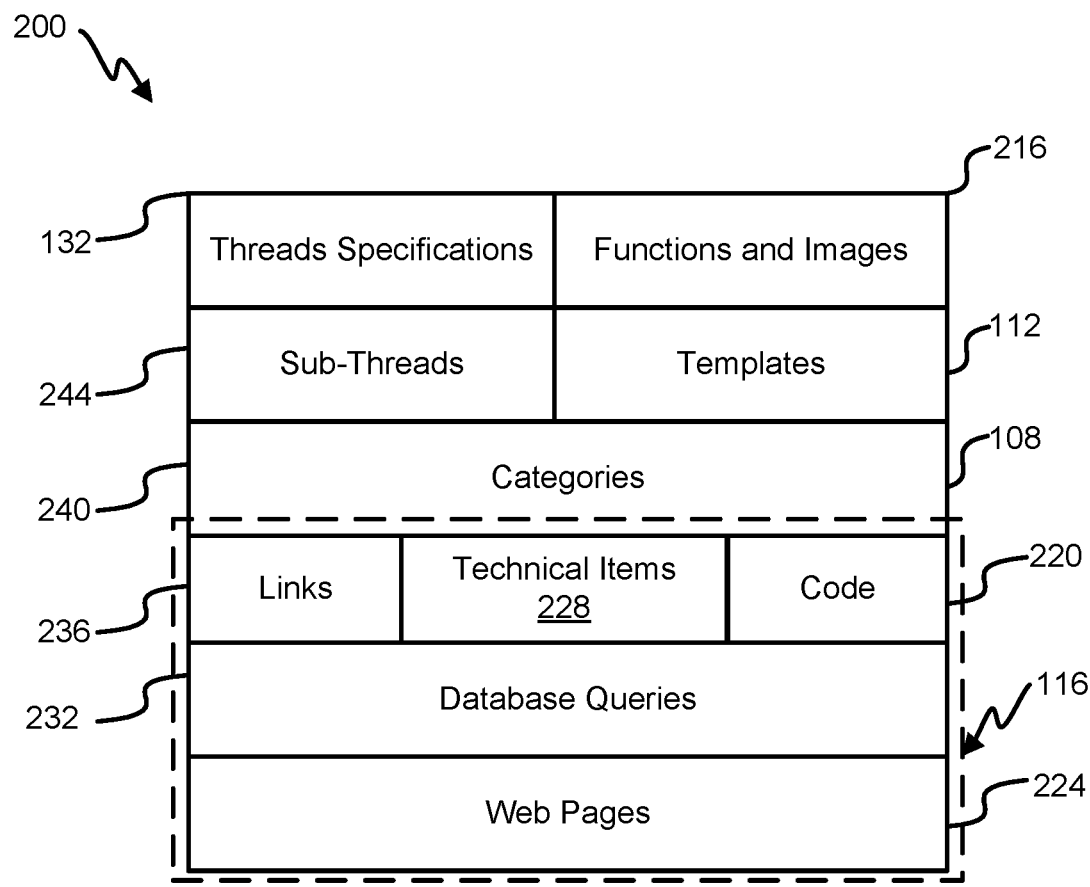
FIG. 2 illustrates an exemplary block diagram of a thread composer.

FIG. 2 depicts an exemplary block diagram of a thread composer 200. A thread composer 200 may include instructions, thread templates/sub-templates, and any other data and/or software for generating a thread or thread specification. In some examples, the thread composer may be part of or reside within the same hardware as processing resource scheduler 104. In other examples, thread composer 200 may be distributed across multiple devices. Thread specifications 132 may be generated using one or more thread templates 216 that are retrieved upon a selection of category 108. A category 108 selection may also provide one or more functions 244 that include steps for implementing the functionality of the thread.

Data layer 116 may include links 236, technical items 228, and code 220, database queries 232 and web pages 224.

Code 220 includes instructions for generating threads and thread templates, scheduling threads and functions for execution, and for provisioning the threads and functions. Technical items 228 may include data structures, functions, and scheduling information related to a function, thread, or thread template. Links 236 provide data to threads and functions at runtime. For example, some aspects of a thread or function may be provided indirectly (e.g., a function may declared and/or called, but not implemented). On those examples, a link may be embedded into a portion of the thread and/or function. At runtime details corresponding to the link will be resolved to enable the function to be executed. Other data may also be provided indirectly through a link (e.g., user or machine input, variable references, data types, classes, objects, functions, images, and/or the like).

Database queries 232 may include a queries, query templates, and/or a history of previously executed templates. For example, a thread may execute a query to obtain data as part of a function or to manipulate data within a database. Web pages 224 include a remote interface to threads specifications and thread/function templates. Web pages 224 may be used as remote access to generate thread specifications and/or to obtain thread specifications for execution remotely or on another device. In some examples, thread composer 200 may reside on a thin client accessed remotely via a web application hosted by one or web pages 224.

Figure 3A:
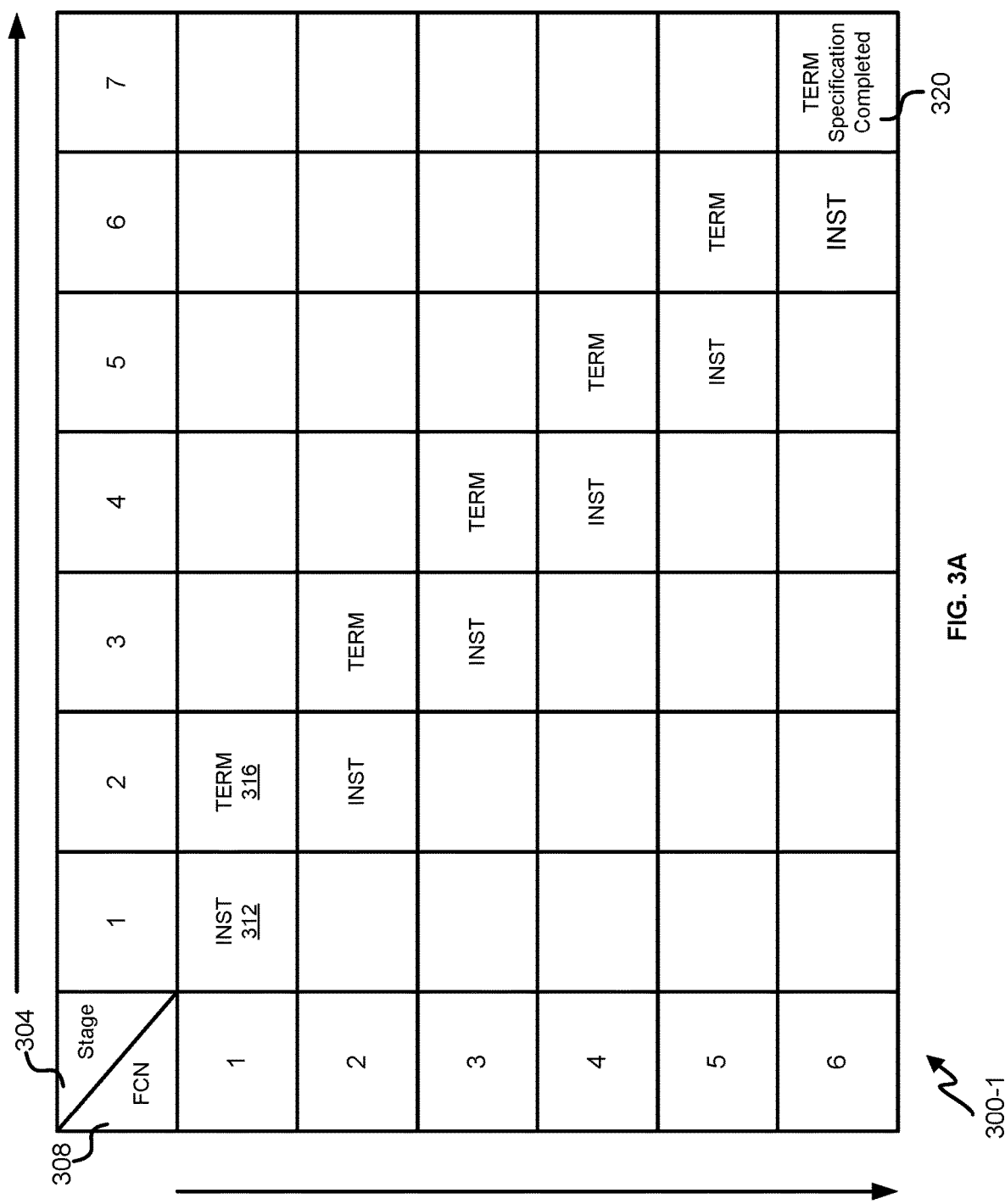
FIG. 3A illustrates an exemplary pipeline implementing a set of threads.

FIG. 3A depicts an exemplary pipeline 300-1 illustrating a schedule for executing a thread specification. A thread specification may include functions 308 scheduled to execute functions via a pipeline. Functions may be scheduled for execution according to the processing stages (e.g., an individual processing unit) 304 of the system. Threads and/or functions may use processing stages for an initialization, such as 312, and a termination such as 316. In addition, threads and/or functions may use one or more processing stages for other tasks (e.g., loading from registers/cache, writing to a register/cache, receiving user input, no-operation instructions (NOPs), and/or the like). Functions may be processed in-order or out-of-order depending on how each function may depend on other functions.

Pipeline 300-1 depicts a thread specification processed over seven stages. In some examples, a thread may be defined by an administrator from a thread template. In those examples, a thread template may be selected by an administrator and each function of the thread defined and/or modified by the administrator such that execution of each function performs a goal intended by the administrator. For example, an administrator may use a user interface to define the functions of a function and/or user interfaces for the function. The user interfaces of a function may guide the execution of functions of a function by an end-user (e.g., who may provide input and our other data for a function). Pipeline 300-1 depicts a thread executed through the execution of six functions, each executed in order. Pipeline 300-1 enables a function to instantiate during a termination stage of a previous function to avoid wasting stages (e.g., preventing process downtime). Upon termination of the last function, the thread specification is completed and the process may terminate, execute a subsequent thread, or wait for further threads to be allocated to the scheduler.

Figure 3B:
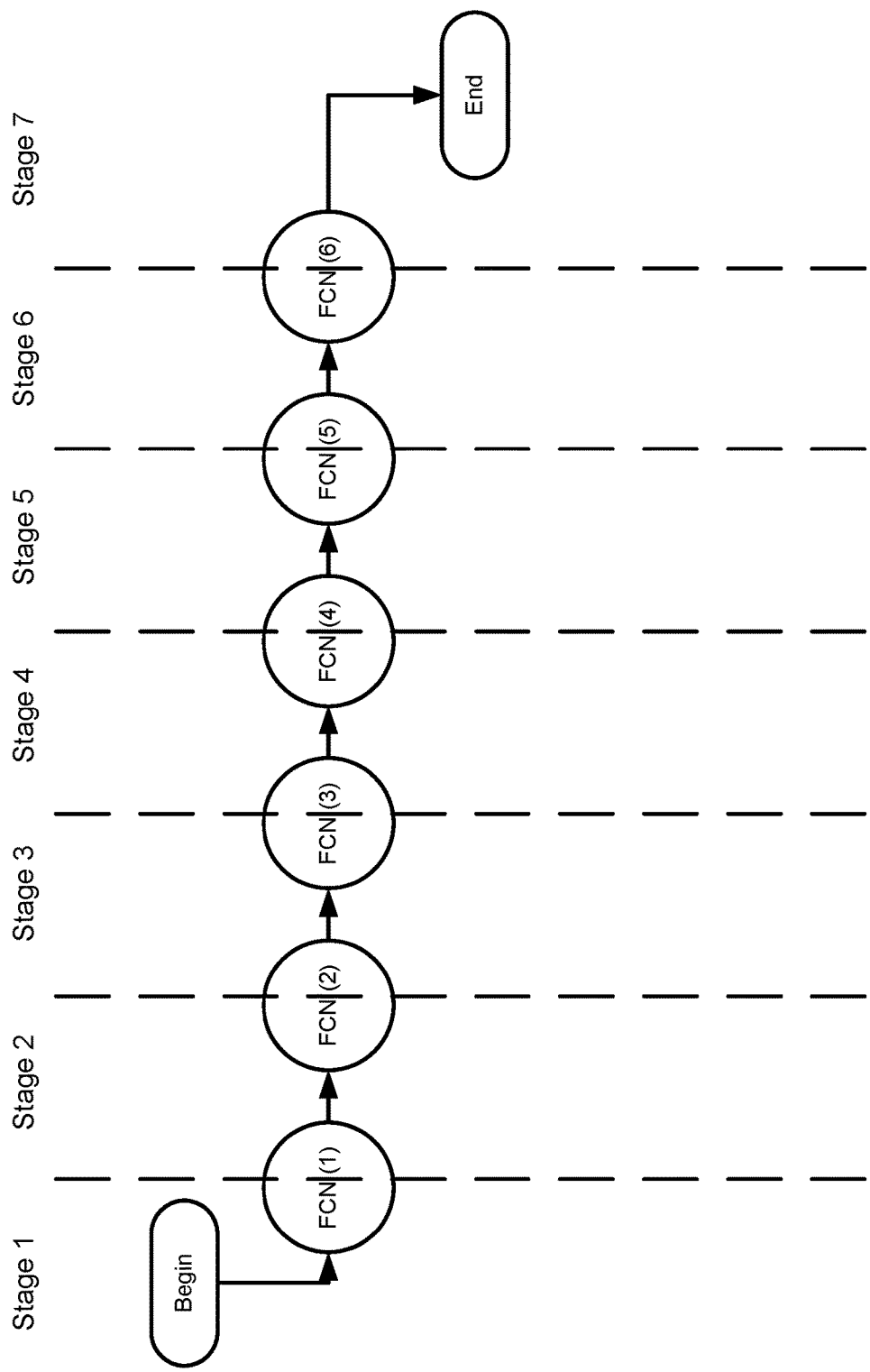
FIG. 3B illustrates an exemplary execution order of the set of threads.

FIG. 3B depicts an exemplary execution order of the thread specification depicted in FIG. 3A. The six functions are labeled from FCN (1) (e.g., function 1) to FCN (6). Executing the specification begins during stage 1 where FCN (1) executes between stage 1 and stage 2. Upon termination of FCN (1) during stage 2, FCN (2) begins continuing to stage 3, and so on until the six functions terminate execution. In this exemplary execution order, each function may receive an input and produce an output. The output may be the input of a subsequent function which may dictate an in-order execution of the functions.

Figure 4A:
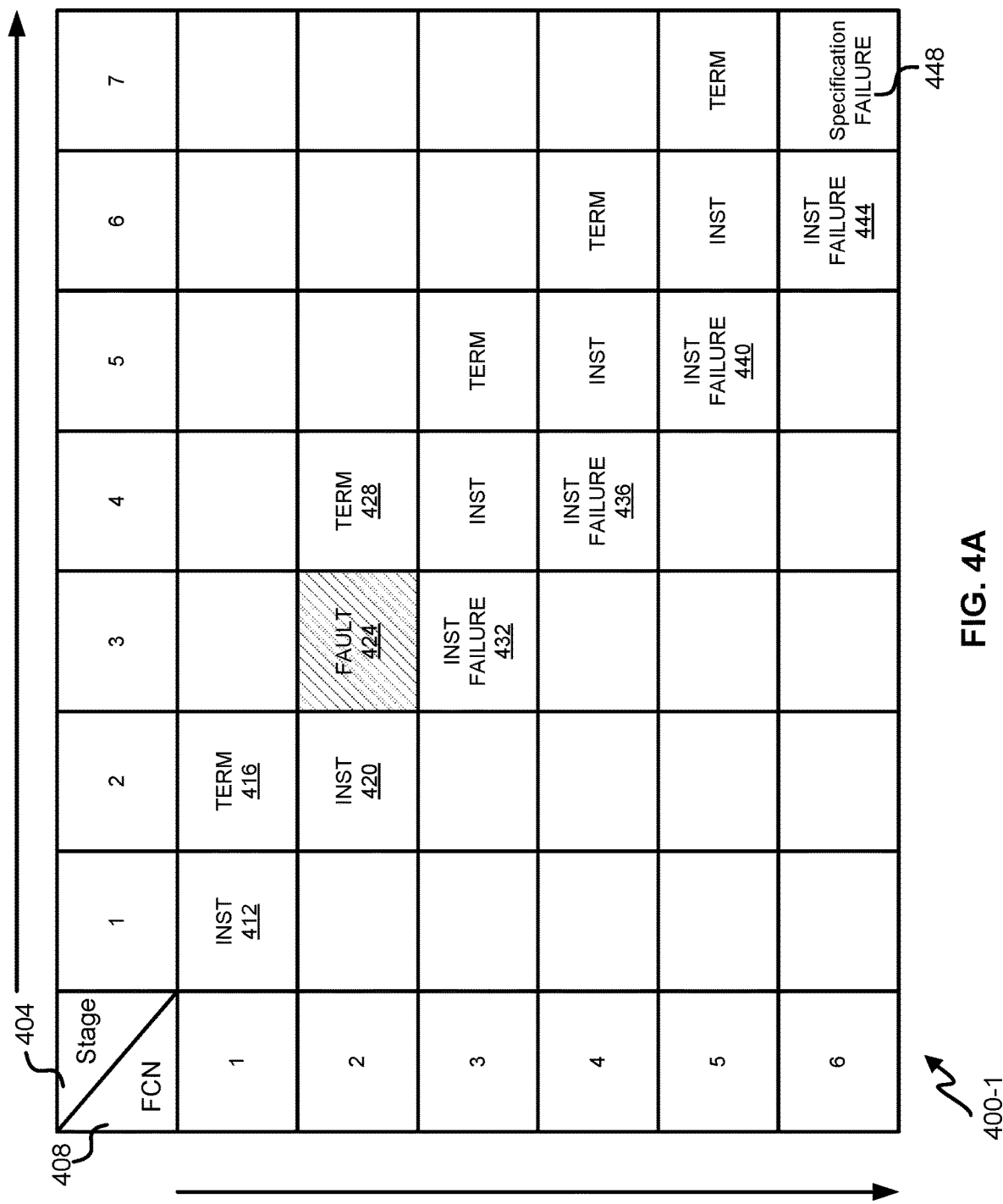
FIG. 4A illustrates an exemplary pipeline implementing a set of threads in a time sensitive execution environment.

FIG. 4A illustrates an exemplary pipeline implementing a thread specification within a time sensitive execution environment. Some execution environments restrict the allocation of resources to particular applications. For example, a secure application may have a higher priority than other applications which cause the system to allocate particular resources to execute the secure application and limit resources available to other applications. Processing resources may include time (stages), memory, processor, network bandwidth, and/or the like. The depicted pipeline has a limited number of stages 404 to execute the functions 408 (which may be the same or different from the functions depicted in FIG. 3A). A first function may instantiate at 412 during stage 1 and terminate at 416 during stage 2. A second function may instantiate at 420 during stage 2 during the termination at 416 of function 1.

A fault 424 may occur during the execution of function 2 which may prevent function 2 from completing its process or terminating properly. For example, function 2 may be delayed from waiting on a semaphore to unlock access to a register. Other types of faults may not be recoverable such as a deadlock condition (e.g., two functions, each waiting on the other to finish before rendering a register accessible). In response to fault 242, function 2 does not terminate (428) until stage 4 and function 3 cannot instantiate and instead throws an instantiation failure 432 during the expected instantiation stage. The delay may cause a ripple effect that may delay subsequent functions that execute after function 2. In some examples, scheduler may compensate for the delay by rescheduling subsequent functions and thread specifications. In other examples, a delay may be prevented through rescheduling one or more functions (described more fully below in connection with FIG. 5A and FIG. 5B). In still yet other examples, a fault induced delay may cause a critical failure in a thread specification.

For example, in resource-limited environments, threads specifications may cause a system crash if the thread specification uses more processing resource (e.g., memory, processing stages, and/or the like) than the environment has allocated to the thread specification. The thread specification depicted in FIG. 4A may have a stage limit of 7 to execute each function of the specification. Fault 424 may induce instantiation failures in each subsequent function (e.g., 432-444) that was prevented from instantiating during an expected stage. For function 6, the instantiation failures may prevent function from executing or completing within the stage limit for the thread specification.

In some examples, the execution environment may not handle the instantiation fault and instead allow the thread specification to fail. For example, in a secure-execution environment, the thread-specification may be allowed to fail than to permit addition a stages to execute unauthorized code. In other examples, the execution environment may partially handle the fault by halting execution of functions if there are fewer available stages than needed by the function to execute. For example, fault 424 may cause the execution environment halt execution of remaining functions once it is determined that fault 424 may prevent function 6 from completing. The thread-specification may be restarted or the processing resources may allocated to other thread specifications to make use of stages that would have been allocated to functions of a thread specification that would not complete. The thread specifications that fail (e.g., due to a failure or delay) may cause an application associated with the thread to crash (or if the thread is a system-level thread, the system itself may crash).

Figure 4B:
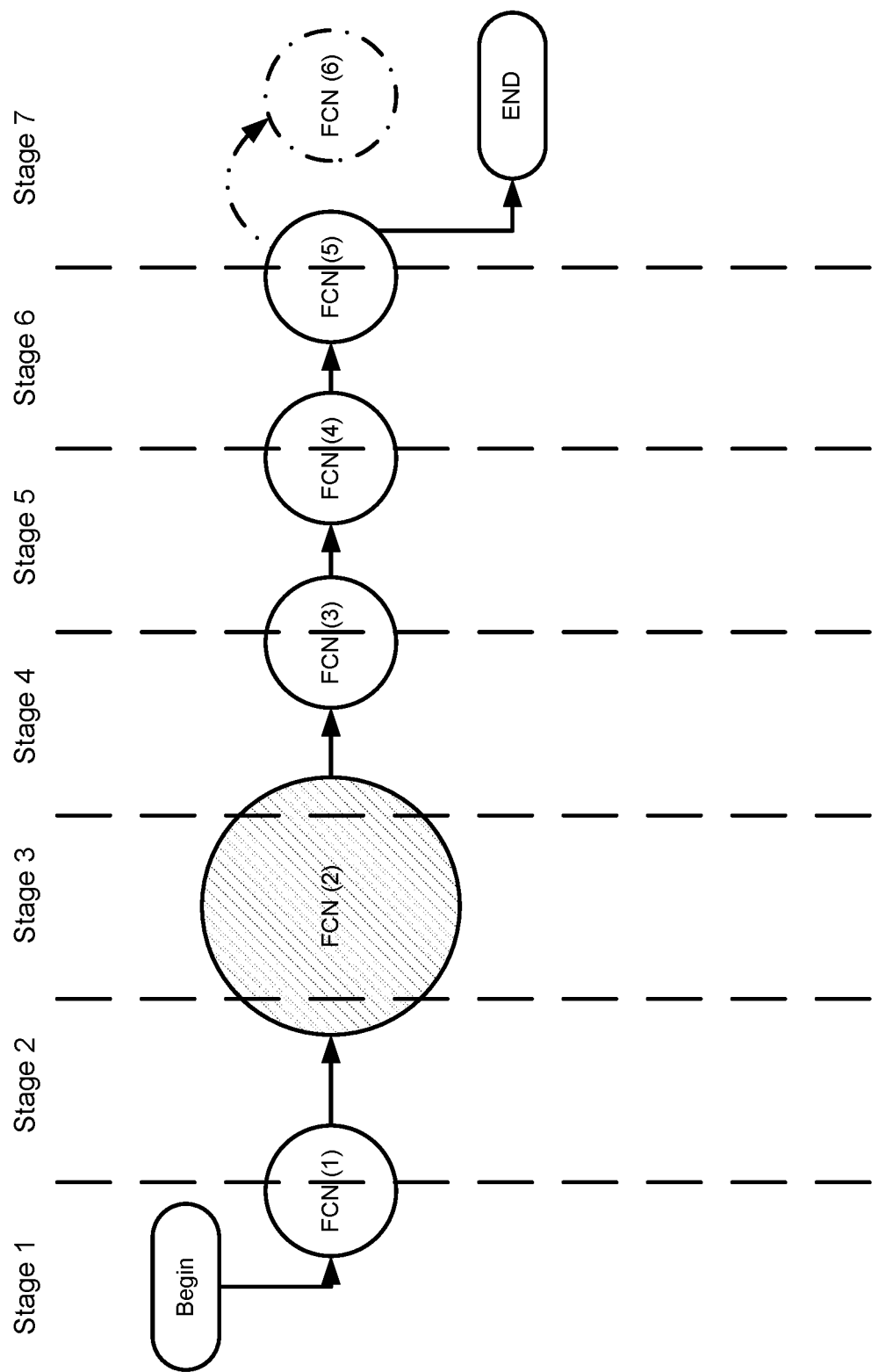
FIG. 4B illustrates an exemplary execution order of a set of threads as a result of a particular fault.

FIG. 4B depicts an exemplary execution order 400-2 of the thread specification depicted in FIG. 4A. Execution of a thread-specification in a resource-limited execution environment may be restricted to 7 stages. Functions may instantiate during a stage and terminates in a subsequent stage. Function 2 may instantiate during stage 2, but encounter a fault (e.g., read/write error, cache miss, locked registers, processor interrupt, exception, and/or the like) delaying function 2 from executing a portion of the function during the stage. Function 2 may not terminate until stage 4, instead of stage 3 as planned.

The failure of function 2 may cause an instantiation failure in function 3 (i.e., FCN (3)) due to the processor waiting for function 2 to terminate. The failure may cause an instantiation failure (i.e. functions 4, 5 and 6) during the stage in which each respective function was scheduled to instantiate. At stage 7, function 5 (i.e. FCN (5)) may terminate. Although, function 6 may be instantiated during stage 7, it may be determined that function 6 may not complete during the 7 stage limit. The instantiation of function 6 may be bypassed and the thread specification may terminate in failure (due to one or more of the functions of the thread specification failing to complete).

Figure 5A:
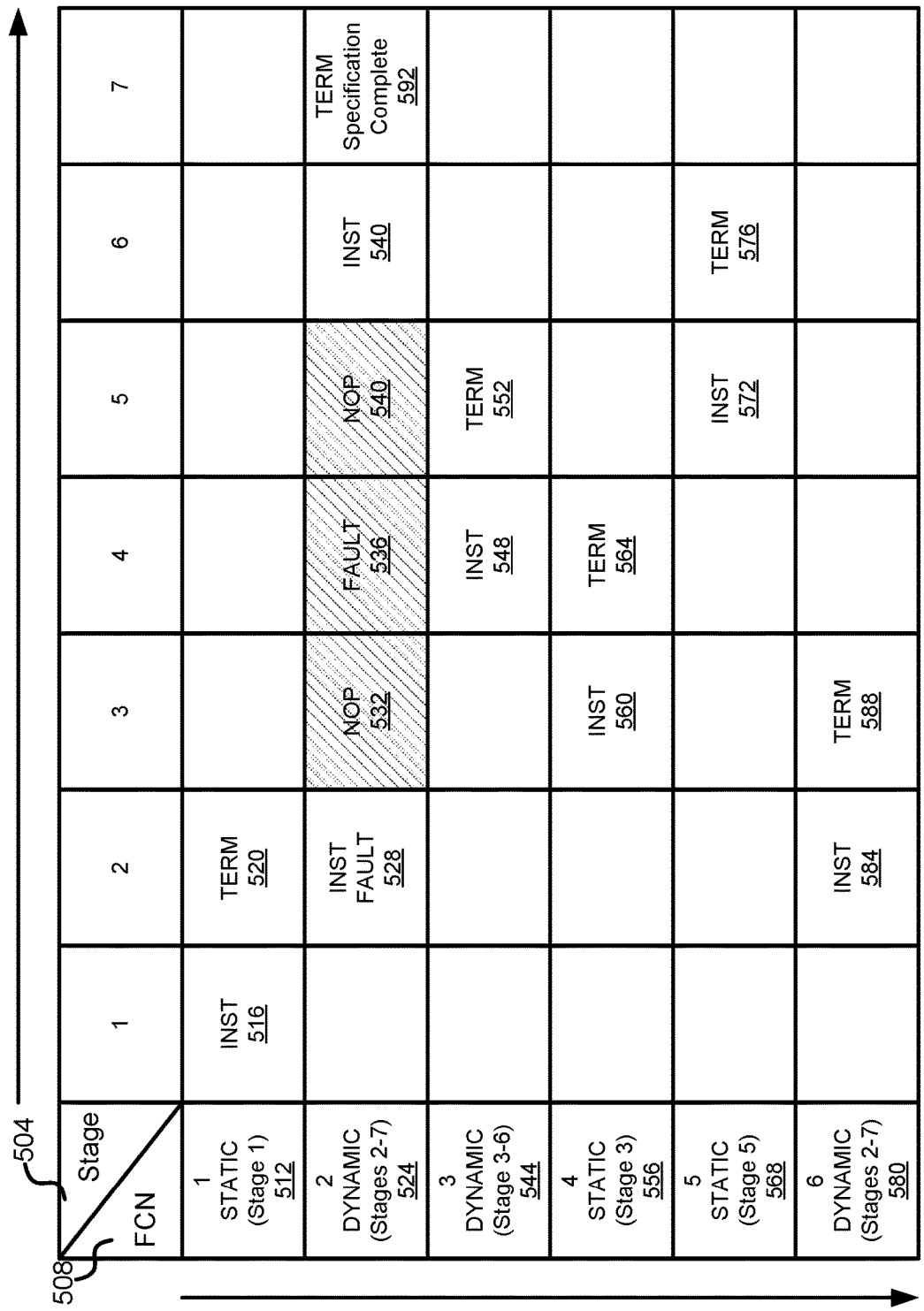
FIG. 5A illustrates an exemplary pipeline implementing a set of threads in a partially out-of-order execution environment.

FIG. 5A illustrates an exemplary pipeline 500-1 implementing a thread specification in a partially out-of-order execution environment. A partially out-of-order execution environment may provide fault-tolerance by scheduling one or more functions during a fault-induced delay. Pipeline 500-1 may represent a thread specification scheduled to execute in a resource-limited environment. The thread specification may be given a 7 stage limit to execute. Scheduler (e.g., processing resource scheduler 104 of FIG. 1) may allocate functions to execute during particular stages. Scheduler may also classify functions as static (e.g., must instantiate in a particular stage, in a particular order relative to other functions, or the like) or dynamic (e.g., may instantiate in any stage, may instantiate in two or more identified threads, may instantiate in any order relative to other functions, or the like).

Function 1 may be a classified as static 512 indicating that function 1 may execute during stage 1 at 516. Function 1 may terminate 520 during stage 2. At 528, an instantiation failure may prevent function 2 from instantiating during stage 2. Function 2 may be classified as dynamic 524 (e.g., may be instantiated during any of stages 2-7) allowing function to instantiate during a later stage. Scheduler may identify another function to instantiate during stage 2 in place of function 2. Scheduler may identify function 6 (e.g., a dynamic function 580, that may be instantiated during any of stages 2-7) as being capable of being instantiated during stage 2. In some examples, two or more functions may be suitable to replace function 2. In those examples, the scheduler may select a function at random, based on one or more rules, based on a priority value assigned to a function, and/or based on a user input of a selection.

Scheduler may attempt to return to the faulty function when the replacement function terminate is possible. In some instances, the pipeline 500-1, scheduler may be unable to return to the faulty function due to a statically classified function (e.g., function 4 at 556). Function-2 may be transformed to a no-operation (NOP) instruction set until scheduler may return to function 2. Function 4 may instantiate at 560 during stage 3 and terminate at 564 during stage 4. At stage 4, the it may be determined that the fault conditions that delayed function 2 are still present. In response to determining that the fault conditions are still present, function 2 may return to fault status at 536 and scheduler may schedule another function for instantiation during stage 4.

At stage 4, there are two instantiated functions: function 3 and function 5. Function 5, cannot be selected as it is statically classified for instantiation at step 5. Function 3 may be dynamically classified and selected to be instantiated next. At stage 5, scheduler may determine that due to function 5's static classification for instantiation during stage 5, function 2 may not be instantiated next. Function 2 may revert back to NOP status at 540 and function 5 may instantiate. Upon termination of function 5 at stage 6, scheduler may return to function 2 which may instantiate to complete the thread specification. The selective and partially out-of-order scheduling scheme may execute thread specifications under similar constraints as the pipeline of FIG. 4A, but flexibly re-order one or more functions to prevent a fault from crashing the thread specification.

Figure 5B:
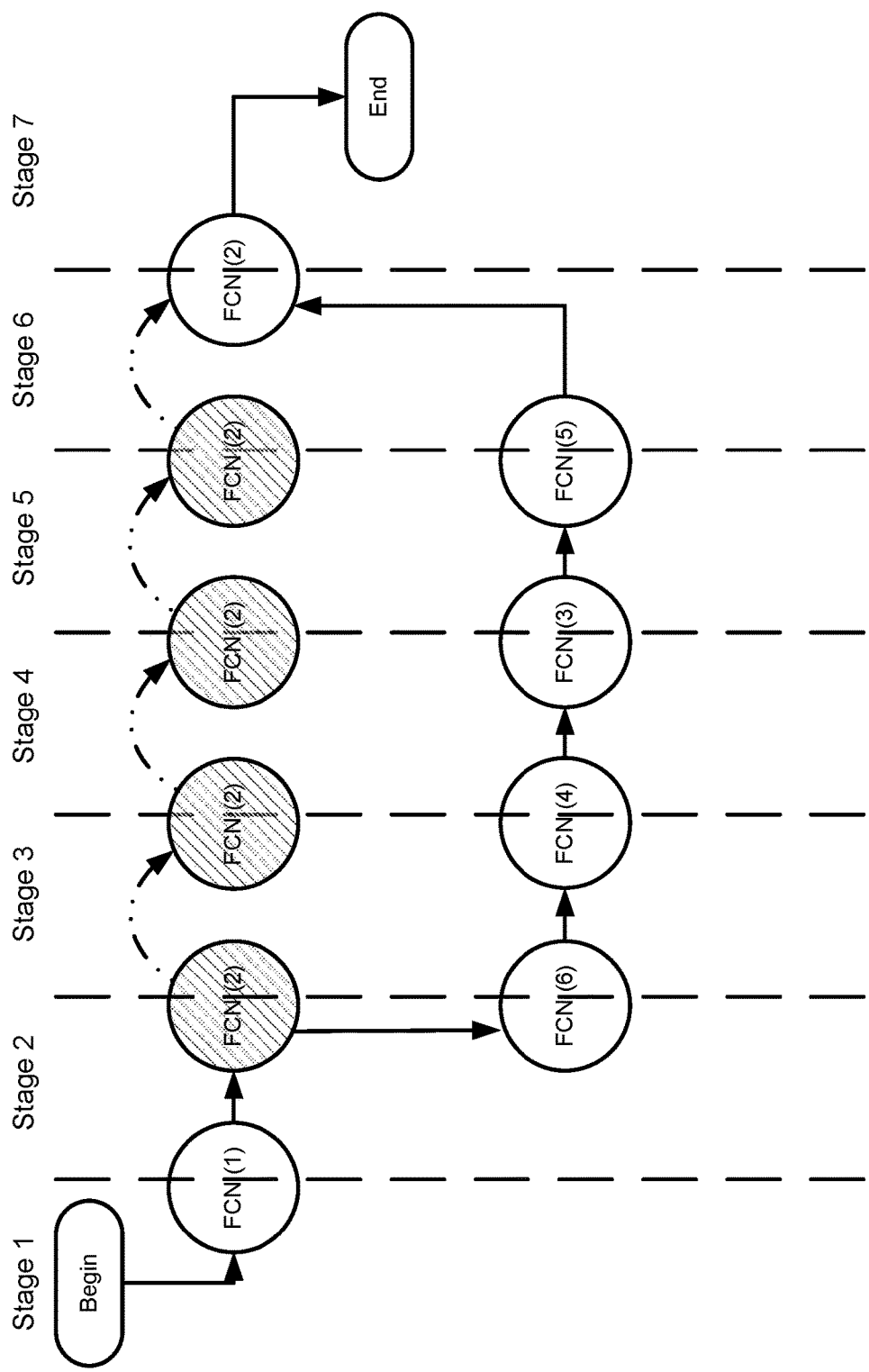
FIG. 5B illustrates an exemplary execution order maintaining fault tolerance through executing threads partially out-of-order.

FIG. 5B depicts an exemplary execution order 500-2 of the thread specification depicted in FIG. 5A. The thread specification may begin with the instantiation of function 1 at stage 1. The execution of function 1 may terminate during stage 2 where a fault is detected while instantiating function 2. Scheduler may provide an alternative schedule to prevent processor (or system) downtime. The alternative schedule may begin by instantiating function 6 during stage 2. Function 4 may be instantiated next, followed by function 3, and function 5. Scheduler may return to function 2 to ensure that function 2 is instantiated and the thread specification completes.

In some examples, the scheduler may define a plurality of possible schedules for a thread-specification. For example, a user (e.g., administrator) may select a primary and secondary order in which each function may be instantiated. Upon detecting a fault that may delay a function, the scheduler may switch to the secondary schedule and instantiate the next function according to the secondary schedule. In other examples, an alternative schedule may be defined for a thread specification dynamically (e.g., at runtime). In those examples, upon encountering a fault, the scheduler (or end-user) may review a thread specification and select an optimal function to be executed in place of a faulty function. In still yet other examples, the scheduler (administrator and/or end-user) may generate or define a new function to instantiate in place of the faulty function. New functions may be defined during runtime (e.g., via an interrupt or pause in the execution of the thread specification). Functions may be partially executed and paused in favor of instantiating a different function. In those examples, the paused function may be completed at a later time (e.g., to complete the thread specification).

Figure 6:
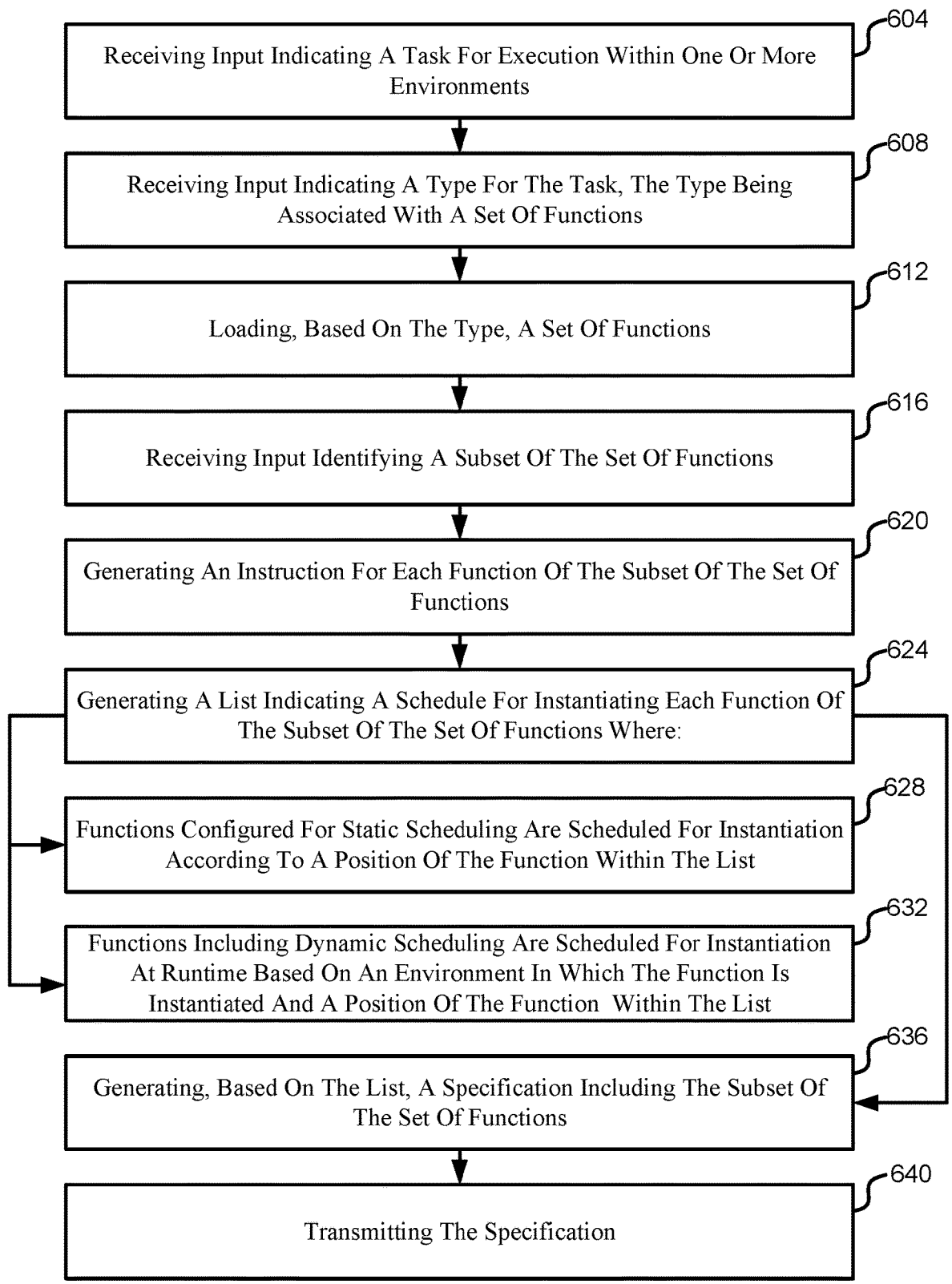
FIG. 6 illustrates an exemplary flowchart depicting a process for generating a thread specification.

FIG. 6 describes an exemplary flowchart depicting a process 600 for generating a thread specification. The process may begin a block 604 in which input is received that indicates a task for execution within one or more environments. For example, the one or more environments may include a resource-limited environment, a secure environment, a virtual machine environment, a regular (e.g., unrestricted environment), combinations therefore, and/or the like. A task may be selected by an administrator of one of the one or more environments to execute function or set of functions that manipulate data within the environment (or connected thereto) or manipulate the environment itself. In some examples, one or more developers may define tasks, threads, thread templates, and/or functions for selection by an administrator to enable the administrator assemble one or more threads, thread templates, and/or functions to perform the task within the environment.

At block 608, input may be received indicating a type for the task. The type of task (e.g., establish network connection, establish a cryptographic algorithm/key, a workflow task, etc.) may correspond to a thread template associated with a set of functions which may be executed to perform the selected type of task. Thread templates may include a mandatory (or selectable) order in which the functions may be executed. In some examples, a task template may include more functions than needed to execute the task. For example, two or more functions may cause a similar result in different ways. A scheduler (or administrator) may provide a selection of one of the two or more functions for the task. In some examples, a thread template may not exist. In those examples, the environment (or administrator) may define a thread template by selecting one or more functions from a set of previously defined functions that are associated with tasks assigned with the type.

At block 616, input may be received indicating a selection of a subset of the set of functions. A type of task may be associated with excess functions (e.g., alternative functions, optional functions, etc.). The input may be indicate which functions are to be included to execute the task and which functions may not be necessary. In some examples, the input may indicate one or more functions that are mandatory (e.g., must be included to execute the task) and one or more functions that are optional (e.g., may be included by an end-user, administrator, or thread scheduler).

In some examples, the subset of the set of functions may be configured (e.g., by an end-user, administrator, or thread scheduler). Configuring functions may include modifying or altering instructions associated with a function to perform a particular subtask, process particular data types or in a particular way, produce a particular output, generate one or more graphical user interfaces, handle errors (e.g., exception/interrupt handler), and/or the like. Configuration may include adding additional instructions to a function such that execution of the function performs additional subtasks. Functions may be modified in any way to provide the functionality of a thread.

At block 620, a scheduler may generate an instruction assigned to each function of the subset of the set of functions. Scheduler may generate instructions (e.g., static or dynamic) to enforce a scheduling policy such as in-order, out-of-order, or partially out-of-order execution of the functions. For example, one or more functions of the subset of functions may have an static instruction indicating the function is to be executed according to an assigned order (or at an assigned time). Functions that initialize the environment or that produce an output used by another function may receive a static instruction to ensure that the thread specification instantiates that function before the function that uses the output.

A function may receive an dynamic (e.g., out-of-order) instruction based the function being independent from other functions. For example, a function that does not rely on output or processing performed by other functions may be instantiated at any time during execution of the thread specification. A scheduler may use functions assigned a dynamic instruction to dynamically reorder the execution of a thread specification at runtime when a fault is detected during instantiation of a function. Dynamically reordering the execution of the thread specification may ensure that the processor (and/or end-user) can continue to execute functions/task even though one or more functions/tasks experience a fault or delay.

In some examples, A function may receive a partially dynamic instruction based the function being partially independent from other functions. Functions with a partially dynamic instruction may be instantiated out-of-order subject to one or more constraints. For example, a particular function may depend on output from a first function, but not rely on any other functions. A scheduler may identify the scheduling constraints for the particular function. During execution of the thread specification, if a dynamic reorder is triggered, the scheduler may instantiate the particular function out-of-order provided the output from the first function is available. If the output from the first function is unavailable, than a different function may be instantiated instead.

A function with a partially dynamic instruction may have a plurality of constraints that prevent aspects of out-of-order instantiation. Constraints may indicate that a function is to execute between particular execution stages of a processor, in a particular loosely defined order (e.g., after a one or more functions function and before another function), at a particular time or time range (e.g., at 3:00 AM or between Monday and Friday). A constraint may indicate the aspects of other functions that a function is dependent on. For example, a function may be dependent on processing result of another function, a modification to the environment caused by another function, user (e.g., end-user or administrator) input, and/or the like.

At block 624, an list may be generated indicating an order for instantiating each function of the subset of the set of functions. The scheduler may use the instruction assigned to each function of the subset of functions to define the order. In some examples, the list may include two sections with functions including a static instruction being ordered first and included in the first section and functions including a dynamic instruction being included in the second section of the list. In some examples, the scheduler may order functions with a static instruction first and order functions with a dynamic instruction around the functions with a static instructions. In other examples, functions may be scheduled according to a predefined or user-selected order in which the scheduler may this order if the predefined or user-selected order violates the a static or dynamic instruction. The list may provide an optional ordering in which:

At block 628, functions with a static instruction may be scheduled for instantiation in the particular order within the list; and At block 632, functions including dynamic instruction may be scheduled for instantiation at runtime based on an environment in which the function is instantiated and a position of the function within the list. For example, functions with a dynamic instruction may be instantiated the order the function is positioned within the list provided a fault or other delay is not detected within the environment. If a condition within the environment causes a fault or delay in the instantiation or execution of a function, the scheduler may schedule one or more functions to instantiate at runtime. A condition within the environment may include an error/fault, a delay, interrupt, exception, administrator or end-user input, and/or the like.

In addition to being assigned a static or dynamic scheduling instructions, functions may be assigned an parallelization instruction that may indicate whether a function may be executed in series or in parallel with one or more other functions. The scheduler may use the parallelization instruction and the constraints associated with each function to schedule instructions for parallel execution. In some examples, dynamic or partially-dynamic functions are instantiated in parallel based on dynamic or partially-dynamic functions lack of dependencies on other functions. The execution environment may enable or disable parallel execution. In some examples, the determination as to execute in series or in parallel may be determined a runtime based on the execution environment and/or process resources available to the execution environment.

In some examples, the schedule of functions may be partially optional enabling the execution environment, end-user, and/or functions themselves to determine which function should be instantiated following the termination of a previous function. For example, a terminating function may indicate one or more functions that should be instantiated next. The Scheduler may determine that the schedule of functions will not be violated (e.g., a static function will not be instantiated out-of-order) before instantiating the one or more functions indicated by the terminating functions. In some examples, an end-user may select a subsequent function to instantiate provided that the selected function does not violate the schedule.

At block 636, the subset of the set of functions may be packaged into a thread specification. A thread specification may include the subset of functions, instructions (e.g., scheduling instructions and/or other instructions associated with the thread specification), the list, metadata, and/or the like. The thread specification may include a discrete set of instructions for performing the task (e.g., the selected task 604). The packaged thread specification may be executed within the environment in which it was packaged or may be executed within one or more other environments. For example, a first environment may generate and package thread specifications for execution within other environments or in connection with other users. In some examples, a packaged thread specification may be include instructions to be executed in any number of disparate environments (e.g., Window, iOS, Android, virtual environments, and/or the like) without further modification or translation.

At block 640, the packaged thread-specification may be transmitted to a remote device. In some examples, the remote device may execute the thread specification. In other examples, the remote device may provide a repository of packaged thread specifications. In those examples, a user interface may enable a user (administrator or user) to obtain a packaged thread specification at a later time. Functions of a thread specification may be instantiated and executed entirely by one or more processors or by one or more processors and one or more end-users. For example, a function may be defined by an administrator to include a graphical user interface and one or more instructions for an end-user to provide input, processing, and/or other data corresponding to the function. Once the thread specification is transmitted (and/or stored), the process may terminate or may return to step 604 enabling the selection of a new task and the generating a new thread specification.

Figure 7:
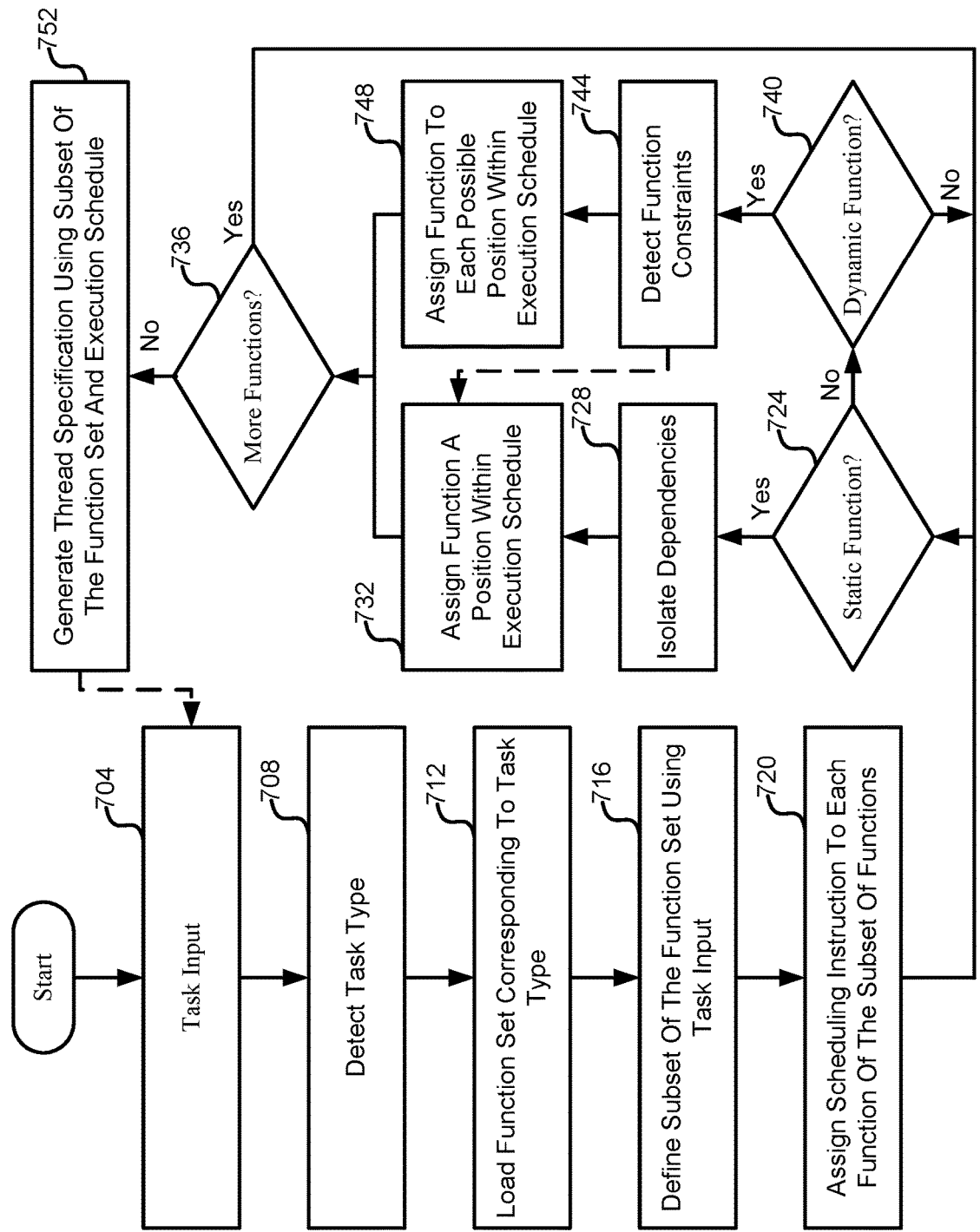
FIG. 7 illustrates an exemplary flowchart depicting a process for defining a schedule of functions for implementing a thread.

FIG. 7 illustrates an exemplary flowchart depicting a process for scheduling functions for a thread specification. The process begins at block 704 where a task may be input. A task may be represented in terms of a result (e.g., a modification to data within or in connection to a processing environment) or output (e.g., processing input to produce a data output). A computing device or user may select tasks to generate one or more applications, application features, graphical user interfaces, algorithms, data processes, and/or any other function executable by the computing device. For example, a task may be selected to provide processing of a data stream from a remote database.

At block 708, a task type associated with the task may be detected. In some examples, a task type may be based on the type of processing executed by the task (e.g., output or result). In other examples, the task type may be a representation of a particular classification of output or classification of result. For example, data calculation (e.g., output) based tasks may be of one task type and data aggregation/classification (e.g., also output) based tasks may be of another type. A type for a task (output or result oriented) may be generated at any level of granularity Using the example above, the data calculation and data aggregation/classification may be considered under the same type (e.g., data processing) or separated based on user input or input from a computing device. Similarly, result base tasks may be classified at any level of granularity such that tasks that execute an application may be considered a same task type or different from tasks that execute discrete application features. Tasks that execute an application may be of a different task type than tasks that execute communication protocols or cryptographic policies.

At block 712, functions associated with the task type may be loaded. A process may load the set of functions using a function manifest, a function database, from one or more local or remote memories and/or the like. Each task type may correspond with a set of functions. The set of functions may include more functions then needed to execute the task. For example, a cryptographic protocol may include a set of hashing functions (e.g., MD5, SHA1, SHA2, and/or the like) in which only one function may be selected to execute the task. The set of functions may be functions associated with each step of executing the task and including optional, redundant, or alternative functions for each step which may be selected, omitted, and/or added by the computing device or user.

At block 716, a subset of the set of functions may be defined using the task input. The subset of the set of functions may include the functions selected by a computing device and/or user to execute the task. The subset of functions may include the minimum functions needed for the task, a default selection of functions, a selection of one or more additional functions (e.g., for redundancy or to provide additional features), and/or the like. In some examples, a user may select one or more functions to be included in the subset of functions based on the task and task type, and/or environment (or another user) associated with executing the task.

At block 720, a scheduling instruction may be assigned to each function of the subset of functions. The scheduling instruction may indicate that a function is static (e.g., must be executed in a particular order in executing the task) or dynamic (e.g., may have some constraints on scheduling, but may be executed in one or more different orders). A static instruction may be assigned to a function that may be dependent on particular environmental conditions, input, and/or the like. A dynamic instruction may indicate that a function may be freely executed subject to one or more constraints (e.g., can execute second or third, but not first).

For example, a first function may execute and provide an output that is used as input for a second function. The first and second functions may be assigned static instructions as the first function must execute first and the second function must execute second. Using the same example with a third function that is also dependent on the input of the first function: now, the first function may be assigned a static instruction as it must execute first to provide input to the other functions. The second and third functions may be assigned a dynamic instruction. While both functions may be constrained to execute after the first function, the second and third function may be interchangeably executed either second or third.

At block 724, it is determined for a first function whether the function is assigned a static instruction. If the function is assigned a static instruction then the process continues to block 728. If the function is not assigned a static function then the process moves to block 736.

At block 728, one or more dependencies of each function of the subset of functions may be isolated. Isolating dependencies may include isolating the static functions dependencies (e.g., intended input, processing conditions, environment state conditions, execution time, time of day, and/or the like), and the other functions in the subset of functions. For example, a dependency may be detected if all other functions in the subset rely on an output generated from a particular function. These dependencies may be based on, for example only, expected output, expected result, algorithm executed, expected environment state conditions post execution, execution time, and/or the like.

At block 732, the first function is assigned a position within an execution schedule based on the isolated dependencies. Functions assigned a static instructions may be assigned a single position with the execution schedule. Using the example above, if all other functions rely on an output of the first function, the first function may be assigned the first position within the execution schedule to ensure it executes first to provide the necessary output.

At block 736, it is determined whether there are additional functions in the subset of the set of functions that need to be scheduled. If there are more functions to schedule, then the process may return to block 724 in which a next function may be evaluated for scheduling.

For example, returning to block 724 where, for a second functions assigned a dynamic instruction, it is determined that it is not assigned a static instruction, then processing may continue at block 740.

At block 740, it may be determined whether the second functions is assigned a dynamic function. If the function is not assigned a dynamic instructions then the process may return to step 724, terminate (e.g., in error), or assign the second function a new scheduling instructions which may be one of static or dynamic. If the second function is assigned a dynamic instruction then the process continues to 744.

At block 744, constraints on the second function may be determined. Functions assigned a dynamic instruction may initially be executed during any position within the execution schedule. One or more constraints may eliminate particular positions within the execution order to prevent another function from failing to execute. If only one position remains, the scheduling instruction is reassigned to a static instruction and the process transitions to block 732. Constraints may include the same or similar conditions evaluated to determine dependencies (e.g., expected input or output, execution time, execution order, time of data, expected environmental state, static function already assigned a particular position, and/or the like). In addition, constraints may be evaluated for other functions in the subset to ensure that he other functions may have the proper input/output, environmental state conditions, and/or the like to execute.

At block 748, the second function may be assigned to each position within the scheduling order that remain after application of detecting constraints. For example, a first function that provides an output used as input for a second function and a third function, the second and third function may be assigned a dynamic instruction with a constraint on executing in the first position. The second and third function would each be assigned to positions two and three within the execution to indicate that either the second or the third function may be executed in the first position or the second position.

At block 736, it is determined whether there are additional functions in the subset of the set of functions that need to be scheduled. If there are no more functions in the subset of the set of functions to schedule, then the process moves to block 752.

At block 752, a thread specification may be generated. The thread specification may include the subset of the set of functions and the execution schedule. In some examples, the thread specification may include the instructions, metadata, functions, schedule, and/or any other code to execute the thread specification within one or more environments. In some examples, a thread specification may be generated to execute within a particular environment. The thread specification may be modified later to execute in a different environment. In some examples, once the thread specification is generated, the process may return to receiving task input 704 in which another task input may be received for generating another thread specification.

In other examples, once the thread specification is generated, the thread specification may be tested for efficiency, efficacy, error detection/correction, and/or the like based on an estimated execution time, number of functions, scheduling efficiency, error codes, exceptions/interrupts generated, and/or the like. If a thread specification fails a test, then the thread specification may be disassembled and processing may return to a step in which the error or inefficiently likely occurred. For example, if a function was assigned an incorrect scheduling instruction causing in incorrect execution schedule, the process may return to 720 rather than starting over at 704. If the tests pass (or if no testing is performed) and no additional task input is received, the process may wait for further input, or terminate.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope.

What is claimed is:

1. A method of scheduling functions for execution of a task in a partially out-of-order execution environment, the method comprising:
   receiving input indicating a task for execution within one or more environments;
   receiving input indicating a type for the task, the type being associated with a set of functions;
   receiving input identifying a subset of the set of functions, the subset of the set of functions being configured to execute the task;
   generating an instruction for each function of the subset of the set of functions, the instruction indicating that the function is configured for static scheduling or dynamic scheduling;
   generating a list indicating a schedule for instantiating each function of the subset of the set of functions, wherein functions are scheduled for instantiation based on the instruction corresponding to each function of the subset of the set of functions such that:
     functions of the subset of the set of functions configured for static scheduling are scheduled for instantiation according to a position of the function of the subset of the set of functions within the list;
     functions of the subset of the set of functions configured for dynamic scheduling are scheduled for instantiation at runtime based on an environment in which the function is instantiated and a position of the function of the subset of the set of functions within the list; and
   generating, based on the list, a specification, the specification including the subset of the set of functions;
   transmitting the specification, wherein the specification is configured to instantiate each function, based on the schedule of the list, to execute the task.

2. The method of claim 1, wherein functions including a static scheduling instruction are prevented from being instantiated out-of-order from the schedule prescribed by the list.

3. The method of claim 1, wherein functions including a dynamic scheduling instruction are instantiated at any time after a predetermined constraint is satisfied.

4. The method of claim 1, wherein a particular function with a static scheduling instruction receives input that was output from a previously instantiated function.

5. The method of claim 1, wherein a particular function outputs an indication of a function to be instantiated after the particular function.

6. The method of claim 1, wherein functions including a dynamic scheduling instruction are instantiated in parallel with one or more functions including a dynamic scheduling instruction and/or one or more functions including a static scheduling instruction.

7. The method of claim 1, wherein functions including a static scheduling instruction are instantiated in series and wherein functions including a dynamic scheduling instruction are instantiated in an order determined by user input.

8. A system comprising:
   one or more processors;
   a non-transitory machine-readable storage medium containing instructions, which when executed on the one or more processors, cause the one or more processors to perform operations including:
     receiving input indicating a task for execution within one or more environments;
     receiving input indicating a type for the task, the type being associated with a set of functions;

receiving input identifying a subset of the set of functions, the subset of the set of functions being configured to execute the task;

generating an instruction for each function of the subset of the set of functions, the instruction indicating that the function is configured for static scheduling or dynamic scheduling;

generating a list indicating a schedule for instantiating each function of the subset of the set of functions, wherein functions are scheduled for instantiation based on the instruction corresponding to each function of the subset of the set of functions such that:

functions of the subset of the set of functions configured for static scheduling are scheduled for instantiation according to a position of the function of the subset of the set of functions within the list;

functions of the subset of the set of functions configured for dynamic scheduling are scheduled for instantiation at runtime based on an environment in which the function is instantiated and a position of the function of the subset of the set of functions within the list;

generating, based on the list, a specification, the specification including the subset of the set of functions; and transmitting the specification, wherein the specification is configured to instantiate each function, based on the schedule of the list, to execute the task.

9. The system of claim 8, wherein functions including a static scheduling instruction are prevented from being instantiated out-of-order from the order prescribed by the list.

10. The system of claim 8, wherein functions including a dynamic scheduling instruction are instantiated at any time after a predetermined constraint is satisfied.

11. The system of claim 8, wherein a particular function with a static scheduling instruction receives input that was output from a previously instantiated function.

12. The system of claim 8, wherein a particular function outputs an indication of a function to be instantiated after the particular function.

13. The system of claim 9, wherein functions including a dynamic scheduling instruction are instantiated in parallel with one or more functions including a dynamic scheduling instruction and/or one or more functions including a static scheduling instruction.

14. The system of claim 9, wherein functions including a static scheduling instruction are instantiated in series and wherein functions including a dynamic scheduling instruction are instantiated in an order determined by user input.

15. A non-transitory machine-readable storage medium containing instructions, which when executed on one or more processors, cause the one or more processors to perform operations including:

receiving input indicating a task for execution within one or more environments;

receiving input indicating a type for the task, the type being associated with a set of functions;

receiving input identifying a subset of the set of functions, the subset of the set of functions being configured to execute the task;

generating an instruction for each function of the subset of the set of functions, the instruction indicating that the function is configured for static scheduling or dynamic scheduling;

generating a list indicating a schedule for instantiating each function of the subset of the set of functions, wherein functions are scheduled for instantiation based on the instruction corresponding to each function of the subset of the set of functions such that:

functions of the subset of the set of functions configured for static scheduling are scheduled for instantiation according to a position of the function of the subset of the set of functions within the list;

functions of the subset of the set of functions configured for dynamic scheduling are scheduled for instantiation at runtime based on an environment in which the function is instantiated and a position of the function of the subset of the set of functions within the list;

generating, based on the list, a specification, the specification including the subset of the set of functions; and transmitting the specification, wherein the specification is configured to instantiate each function, based on the schedule of the list, to execute the task.

16. The non-transitory machine-readable storage medium of claim 15, wherein functions including a static scheduling instruction are prevented from being instantiated out-of-order from the order prescribed by the list.

17. The non-transitory machine-readable storage medium of claim 15, wherein functions including a dynamic scheduling instruction are instantiated at any time after a predetermined constraint is satisfied.

18. The non-transitory machine-readable storage medium of claim 15, wherein a particular function with a static scheduling instruction receives input that was output from a previously instantiated function.

19. The non-transitory machine-readable storage medium of claim 15, wherein a particular function outputs an indication of a function to be instantiated after the particular function.

20. The non-transitory machine-readable storage medium of claim 15, wherein functions including a dynamic scheduling instruction are instantiated in parallel with one or more functions including a dynamic scheduling instruction and/or one or more functions including a static scheduling instruction.

* * * * *